United States Patent
Stober et al.

[19]

[11] Patent Number: 6,059,934
[45] Date of Patent: *May 9, 2000

[54] CO-CURRENT CONTACTING SEPARATION TRAY DESIGN AND METHODS FOR USING SAME

[75] Inventors: Berne K. Stober, Glen Mills; Raymond M. Sowiak, Newtown, both of Pa.

[73] Assignee: Mobil Oil Corporation, Fairfax, Va.

[*] Notice: This patent is subject to a terminal disclaimer.

[21] Appl. No.: 09/061,492

[22] Filed: Apr. 17, 1998

Related U.S. Application Data

[63] Continuation-in-part of application No. 08/833,490, Apr. 7, 1997, Pat. No. 5,837,105.
[51] Int. Cl.[7] ................... B01D 3/26; B01D 3/32
[52] U.S. Cl. ................... 203/40; 95/200; 95/202; 96/188; 202/158; 202/197; 203/99; 261/114.5; 261/147
[58] Field of Search .................. 95/219, 202, 198, 95/199, 200; 96/215, 202, 204, 188–192, 214; 55/456; 202/197, 158, 239; 203/99, 40, 100; 261/148, 112.2, 113, 147, 114.5, 114.1, 146

[56] References Cited

U.S. PATENT DOCUMENTS

| | | | |
|---|---|---|---|
| 2,047,444 | 7/1936 | Stedman | 261/94 |
| 4,159,817 | 7/1979 | Ikawa | 249/98 |
| 4,296,050 | 10/1981 | Meier | 261/116 |

(List continued on next page.)

OTHER PUBLICATIONS

Hansen et al., "A Practical Guide to Mist Eliminatos Selection", CPI, 1983, 100, 37–38.
Koch Engineering Company, Inc., "Mist Eliminators for entrainment separation", 1984 Bulletin KME–11, 6 pages.
Munters Euroform, "DH 5000 Trofenabscheider (TS 5) Droplet Separator", 8 pages.
Otto H. York Company, Inc., "Mist eliminators for removing mists, sprays and fogs from process streams to . . . raise process efficiency, reduce valuable product loss, increase throughput capacity, improve side draw and overhead purity, prevent downstream corrosion, remove pollutants", 1986, Bulletin 55, 1–3, 6–7, and 10.

*Primary Examiner*—Virginia Manoharan
*Attorney, Agent, or Firm*—Malcolm D. Kenn

[57] ABSTRACT

Tray designs for use in a separation column for distilling or fractionating a feed stream are provided that incorporate co-current contact of the liquid and vapor streams and their subsequent separation on each tray. In one embodiment, located on the trays are a plurality of co-current vapor and liquid contacting sections including a volume of the tray in which vapors and liquid can be in co-current contact. Also located on the trays are a plurality of de-entrainment devices for separating entrained liquids from a vapor stream, the de-entrainment devices having an inner and an outer side, the inner side being adjacent to the co-current contacting sections. The tray design further incorporates a plurality of liquid downcomers, having an upper portion and a lower portion, where the upper portion of the liquid downcomer is capable of accepting liquid from the outer or bottom side of the de-entrainment device of a first tray, and the lower portion of the liquid downcomer is located within the co-current contacting section of a second tray that is vertically lower in the column from the first tray. The trays further contain vapor openings located through the bottom of the trays at a point beneath the co-current contacting sections through which vapors can pass into the co-current contacting section of a tray. In another embodiment, the liquid from some of the de-entrainment devices is directed through conduits to co-current contacting sections that are located horizontally adjacent on the same tray, thereby providing multiple contacts of the liquid with the vapor on a given tray before the liquid is passed down via a downcomer to a lower tray in the column.

10 Claims, 10 Drawing Sheets

U.S. PATENT DOCUMENTS

| | | | |
|---|---|---|---|
| 4,361,469 | 11/1982 | Trutna | 203/99 |
| 4,376,081 | 3/1983 | Leva | 261/94 |
| 4,698,138 | 10/1987 | Silvey | 203/91 |
| 4,770,747 | 9/1988 | Muller | 202/197 |
| 5,132,056 | 7/1992 | Lockett et al. | 261/112.2 |
| 5,283,048 | 2/1994 | Martin et al. | 422/168 |
| 5,413,741 | 5/1995 | Buchholz et al. | 261/112.2 |

CO-CURRENT CONTACTING SEPARATION TRAY DESIGN AND METHODS FOR USING SAME

CROSS REFERENCE TO RELATED APPLICATION

The present application is a continuation-in-part of U.S. patent application Ser. No. 08/833,490, filed on Apr. 7, 1997, now U.S. Pat. No. 5,837,105.

FIELD OF INVENTION

The present invention relates to the design of separation trays useful indistillation and fractionation columns or towers. More specifically, the present invention relates to separation trays that are designed to achieve co-current contact between the liquid and vapors within a tray and are also designed to efficiently separate the liquid from the vapors within the tray subsequent to the co-current contact.

BACKGROUND OF THE INVENTION

Various research has been conducted with respect to the optimization of designs for distillation and fractionation columns or zones, i.e., a contacting column or zone wherein liquid and vapor phases are counter currently contacted to effect separation of a fluid mixture, as for example, by contacting of the vapor and liquid phases on a series of vertically spaced horizontal trays or plates mounted within the column. The design research has primarily focused on the design of different tray structures to improve the efficiency of the overall separation process. Attempts have also been made to design superior packing materials to be placed within the column to enhance the separation process.

The distillation process as traditionally known in the art is a method for separating the individual components of a mixture by utilizing the differences in their vapor pressure. In particular, in the chemical industry, a variety of tray designs have been developed to increase the efficiency of the mass transfer. Improvements in the design of distillation columns led to the use of different types of packing for filling the insides of such distillation columns. For instance, the packing now in use includes wire mesh packing, sheet metal packing, ceramic packing, glass packing, and synthetic resin packing. Many types of packing have been developed for use in distillation and fractionation columns. In general, these packing materials facilitate contact between the liquid and vapor streams by causing more uniform distribution of liquid and vapor over the surface of the packing. Early forms of structured packing include Stedmen packing, described in U.S. Pat. No. 2,047,444. In general, structured packing refers to packing where individual members have a specific orientation relative to each other and to the axis of the column or tower. Random packing, such as the use of Raschig saddles, is also used in the industry.

One type of packing that is widely used consists of a plurality of corrugated plates that contact each other and are disposed in parallel relationship to the column axis. Corrugated plates of this type can be constructed of different types of material such as sheet metal and woven wire fabric. When the corrugated plates are made of sheet metal, uniform distribution of the liquid over the plates is impeded because the liquid tends to channel along the fold troughs. To improve liquid distribution over the corrugated plates, it is known to use apertures in the plates so that a portion of the liquid flowing along one side of the plate is deflected to the opposite side of the plate as it encounters an aperture. An example of such a plate is described in U.S. Pat. No. 4,296,050 to Meier. A column packing made with corrugations and textured surfaces for improved performance especially under turn down conditions is disclosed in U.S. Pat. No. 5,132,056 to Lockett et al. An improved corrugated plate design to achieve a higher density of plates within a given cross-sectional area of the column to achieve enhanced mass and/or heat transfer between the liquid and vapor streams flowing within the column is set forth in U.S. Pat. No. 5,413,741.

Other types of packing besides the corrugated and textured surface plates include packing that consist of individual packing elements. The efficiency in using such packing elements is generally considered to be increased by providing the elements in a random order such as taught in U.S. Pat. No. 4,376,081 to Leva which discloses an element that has a base that has a surface contour which is generated by the rotation of a two-dimensional curve having reverse curvature through an approximate angle range of from 10 to 180 around a straight line that lies within the plane of the curve. The base of the packing element is further provided with slots and depending tongues. A distillation column packing in the form of a spherical body constructed by assembling a pair of hemispherical members of the same shape and structure wherein each of the hemispherical members includes a suitable number of cutout openings formed on the surface portion thereof is shown in U.S. Pat. No. 4,159,817 to Ikawa.

The concept of co-current contact with the liquid and vapor streams within the overall counter-current flow of these two streams within the column has been suggested to enhance the overall capacity of the separation. One example of this concept is the tray design set forth in U.S. Pat. No. 4,361,469 to Trutna. The column has a plurality of vertically spaced trays each consisting of two vertically spaced rows of strips that are parallel and where the strips of the lower row are centered below the spaces of the upper row, and has a separator above each of the trays consisting of plural vertically spaced rows of upwardly facing channels that are parallel and of which the channels of one row are centered between the channels of the adjacent row or rows, the trays and separators occupying a major portion of the cross sectional area of the tower and the remainder of the cross sectional area of the tower being occupied by liquid downcomers.

Improvements in distillation and fractionation column design are needed to increase the efficiency or capacity of the overall separation process and thereby reduce operating and/or fixed costs. Improved designs preferably would take advantage of the entire volume within the column for use in the separation process and utilize efficient contacting of the phases followed by efficient separation of same.

SUMMARY OF THE INVENTION

Tray designs for use in a separation column, such as a distillation or fractionation column, are provided by the present invention, along with methods for conducting a separation process with such a column using the inventive tray designs. The tray designs of the present invention provide for increased separation efficiency and/or increased separation capacity by more efficiently generating co-current contact between the liquid and vapor streams within an individual tray and also for efficiently separating those two streams following the co-current contact within the tray.

The tray design, in one embodiment, is used in a separation column for distilling or fractionating a feedstream wherein the column contains a plurality of interconnected trays having a tray top and a tray bottom. Located on the trays are a plurality of co-current vapor and liquid contacting sections comprising a volume of the tray in which vapors and liquid can be in co-current contact. Also located on the trays are a plurality of de-entrainment devices for separating entrained liquids from a vapor stream, the de-entrainment devices having an inner and an outer side, the inner side being adjacent to the co-current contacting sections, and the inner and outer sides of the de-entrainment devices being permeable to fluid flow. The tray design further incorporates a plurality of liquid downcomers, having an upper portion and a lower portion, where the upper portion of the liquid downcomer is capable of accepting liquid of the de-entrainment device of a first tray, and the lower portion of the liquid downcomer is located within the co-current contacting section of a second tray that is vertically lower in the column from the first tray. The trays further contain vapor openings located through the bottom of the trays at a point beneath the co-current contacting sections through which vapors can pass into the co-current contacting sections of a tray.

The de-entrainment devices of the present invention can be constructed from various known technologies used to de-entrain liquid droplets from a vapor stream. One example of such technologies include demisters or mist eliminators, such as Chevron-type demisters. Another example of such technologies include mesh pads or woven metal threads. Combinations of these mist eliminator technologies can also be used.

One of the methods of the present invention can be practiced by using the above-identified embodiment of the inventive tray design. In the course of the separation process, liquid flows through a first liquid downcomer and into a co-current contacting section of a first tray. At the same time, vapors are directed through the vapor openings of the first tray and into the co-current contacting section of the first tray, whereby the vapors entrain liquid within the co-current contacting section of the first tray to form a mixed phase fluid that travels upward, in a co-current fashion, through the co-current contacting section of the first tray. This mixed phase fluid is passed through the de-entrainment device of the first tray to thereby separate the entrained liquid from the vapors. Following this de-entrainment step, the de-entrained liquid is directed from the de-entrainment device of the first tray to a second liquid downcomer and into the co-current contacting section of a second tray that is vertically below the first tray. Also, the de-entrained vapors from the de-entrainment device of the first tray are directed to the co-current contacting section of a third tray that is vertically above the first tray.

In another embodiment of the tray design of the present invention, the trays are designed such that the liquid present on a tray is repeatedly contacted with the uprising vapor stream on a particular tray by passing the liquid through a series of co-current contacting sections on the particular tray with separation of the liquid and vapor by a de-entrainment device following each contacting step. This design of the tray can be referred to as a "cross flow" design. Such a separation column contains a plurality of interconnected trays that have a plurality of co-current vapor and liquid contacting sections that each comprise a volume in which vapors and liquid can be in co-current contact. The trays also have a plurality of de-entrainment devices for separating entrained liquids from a vapor stream where the inner side of the de-entrainment devices are adjacent to the co-current contacting sections, and where the inner side of the de-entrainment devices are permeable to vapors and entrained liquids and the outer side of the de-entrainment devices are permeable to vapors. With this design, the trays further contain a plurality of liquid conduits that provide a passageway for liquid exiting a first de-entrainment device adjacent to a first co-current contacting section to enter a second co-current contacting section on the same tray as the first co-current contacting section, the liquid conduits thereby provide a means by which the liquid can be transferred from one co-current contacting section to another on the same tray. There is at least one liquid downcomer, located between two vertically adjacent trays, for transporting liquid from the vertically higher tray to the vertically lower tray. As with the other embodiment, there are vapor openings, located through the bottom of the trays at a point beneath the co-current contacting sections, through which vapors can pass into the co-current contacting sections of the tray.

The method for operating the "cross flow" design of the present invention is practiced by flowing the liquid through a downcomer onto a first tray and directing vapors upward to the first tray. The liquid flows into a first co-current contacting section and is entrained therein by the vapors that enter through the openings in the bottom of the tray. The entrained fluid, comprising the entrained liquid and the entraining vapor, is then directed through a first de-entrainment device to separate the liquid from the vapor. The de-entrained liquid is directed through a first liquid conduit to a second co-current contacting section on the first tray where it is again entrained by the vapor rising upward through the first tray. The entraining/de-entraining process is repeated within the first tray for the number of contacts designed for that tray with the liquid eventually exiting the first tray by way of one or more downcomers. The vapors exit the de-entrainment devices on the first tray and travel upward to the next, vertically higher, tray.

DETAILED DESCRIPTION OF THE INVENTION

The present invention provides an improved tray design for use in separation columns, such as distillation and fractionation columns. The tray design provides for co-current contact between the liquid and the vapor phases within the individual, separate, tray sections to improve the overall counter-current separation that takes place within the column.

The particular aspects of the preferred embodiments of the present invention can be understood with reference to the figures where like reference numbers refer to like components of the tray design.

Figure 1:
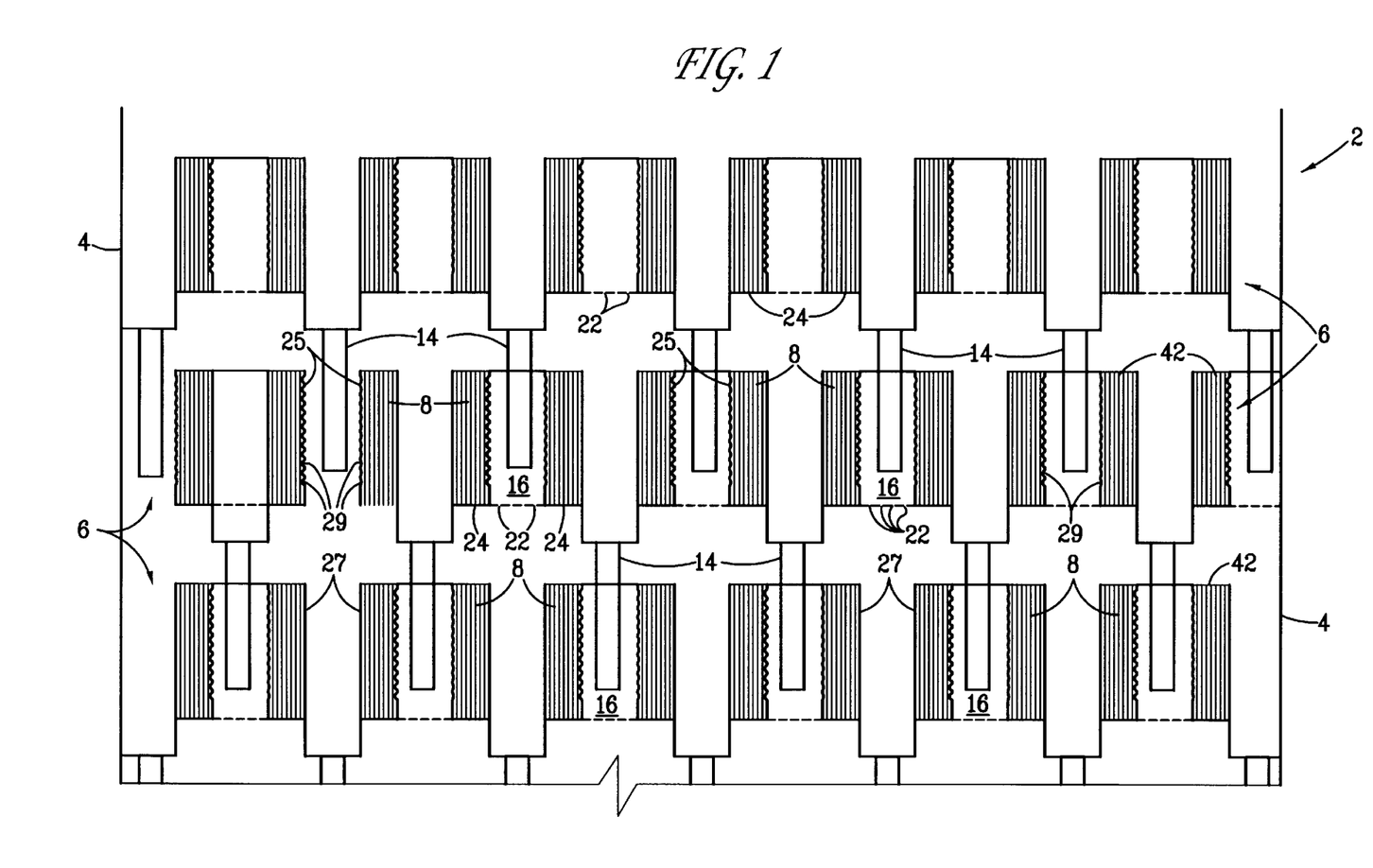
FIG. 1 is a schematic cross-sectional view of an interconnected tray design of one embodiment of the present invention.

One embodiment of the present invention is set forth in FIG. 1, which is a partial cut-away view of a distillation column 2 having column side walls 4 that generally define a cylindrical column shape. The general description of this tray design of the present invention can be made with reference to FIG. 1, and a more detailed description of the mass flows within the column 2 is set forth with respect to the detailed figures that follow. Within the column 2 there are a plurality of separation trays 6. In accordance with the present invention, the liquid flows within the column 2 from one tray to a vertically lower tray through downcomers 14, which provide a passageway for the liquid to flow from an upper tray to a lower tray. The vapors rise up through the column 2 from one tray to the next vertically higher tray and enter into the higher tray through openings 22 through the bottom 24 of the tray 6. The trays 6 include co-current contacting sections 16, within which the rising vapors contact, and entrain the liquid present on the lower portion of that tray 6. The vapors are separated from the entrained liquid within each tray 6 by means of the multiple de-entrainment devices 8. The liquid exits the de-entrainment devices 8 and flows into the downcomers 14 and into a vertically lower tray 6. The vapors exit the de-entrainment devices 8 and pass upwardly to a vertically higher tray 6. The de-entrainment devices 8 are defined by an inner side 25 and an outer side 27. The inner side 25 can be fabricated to be a perforated plate such that openings 29 provide a passageway for the vapors and entrained liquid to enter into the de-entrainment devices 8. Thus, the general components of this tray design of the present invention are presented in FIG. 1. The vapors rise up through the column 2, entering a tray 6 through openings 22 in the bottom 24 of the tray and passing through the de-entrainment devices 8 and upward to the next tray 6. The liquid enters a tray 6 through the end of the downcomer 14 and is entrained by the rising vapors entering through the openings 22. At that point, the vapors and the entrained liquid flow in a co-current direction within the co-current contacting section 16 upwardly through the tray 6. The vapors and the liquid are separated within the tray 6 by means of the de-entrainment devices 8. The vapors exit the de-entrainment devices 8 and continue to rise up through the column 2, while the liquid exits the de-entrainment devices 8 and flows downward through the column 2.

Figure 2:
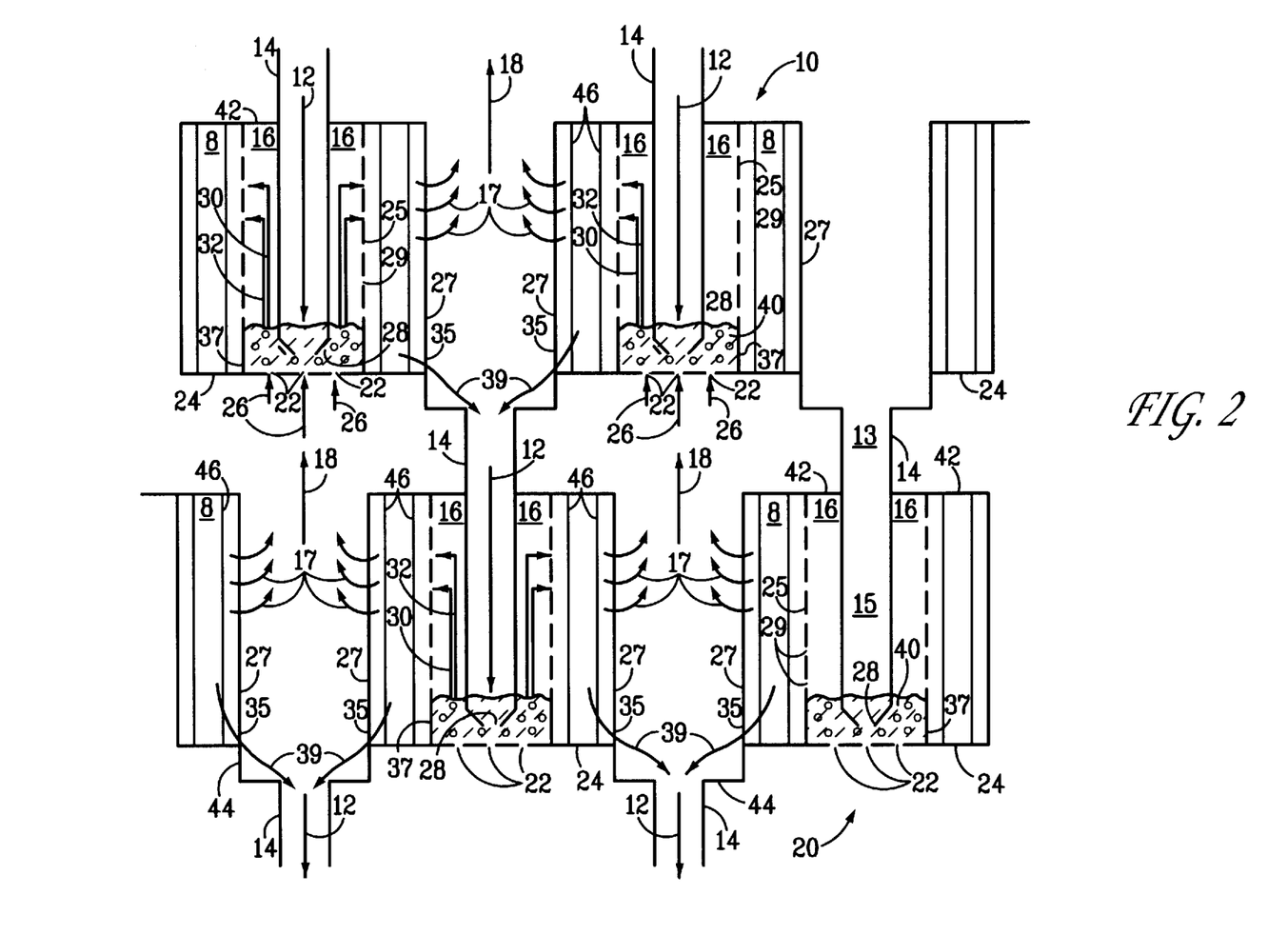
FIG. 2 is a schematic cross-sectional view, in detail with flow depicted, of an interconnected tray design of one embodiment of the present invention.

The tray design shown in FIG. 1 is shown in expanded detail in FIG. 2. Two trays are depicted in FIG. 2, an upper tray 10 and a lower tray 20. The various aspects of the tray design can be explained by following the flow of the vapor stream upward through the column and the flow of the liquid stream downward through the column. As seen with respect to upper tray 10, a liquid stream 12 flows down from the tray immediately above tray 10 through a series of downcomers 14, which define an upper downcomer section 13 located between two adjacent trays, such as trays 10 and 20, and a lower downcomer section 15 located within the lower tray.

As the liquid 12 reaches the bottom of the downcomer 14, it accumulates at the bottom of the downcomer 14 and flows into the bottom of a co-current contacting section 16. The co-current contacting section 16 is an area within the tray 10,20 through which both vapor and liquid flow in a co-current upward fashion. The vapor 18 rises from an adjacent lower tray and enters into the co-current contacting section through openings 22 through the bottom 24 of the tray 10,20. The flow of the vapor through the openings 22 is shown in FIG. 1 by lines 26. Thus, the vapor 18 passing from the lower tray 20 to the upper tray 10 is directed to enter tray 10 only through the openings 22 such that it immediately comes into contact with the liquid flowing out of the exit 28 of the downcomer 14. Within the bottom of the co-current contacting section 16 the velocity of the uprising vapors 26 causes the vapor stream to entrain the liquid to form an entrained liquid stream 30 and an entraining vapor stream 32. The entrained liquid and vapor streams 30, 32 flow upward through the co-current contacting section and flow along the outside of the downcomer 14. The downcomer 14 is preferably situated within the middle of the co-current contacting section 16 so that the up-ward, co-current flow of vapors and liquid is rather evenly distributed on both outer sides of the downcomer 14, although this need not be the case to practice the claimed inventions.

The entrained liquid and vapor streams 30, 32 must be de-entrained, or separated within the tray so that the vapor can rise to the next vertically higher tray and so that the liquid can flow by way of gravity to the next vertically lower tray. This de-entrainment step is accomplished within the de-entrainment devices 8. The tray top 42 prevents the vapor and liquid streams 32,30 from leaving the tray without flowing through the de-entrainment device 8. As shown in FIG. 2, the entrained liquid stream 30 and the vapor stream 32 enter the de-entrainment device 8 by passing through openings 29 in the inner de-entrainment side 25. Within the de-entrainment device 8 the liquid stream 30 is de-entrained from the vapor stream 32. The vapor stream exits through the outer wall 27 of the de-entrainment device 8 as vapor stream 17, which collects and forms vapor stream 18 that exits the tray. In the embodiment shown in FIG. 2, the solid tray top 42 extends the length of the de-entrainment device 8. The liquid stream 39 is formed from the draining of the collected liquid droplets within the de-entrainment device 8 and exits at the bottom 35 of the outer wall 27 of the de-entrainment device 8 to collect in the sump 44 of the downcomer and to form liquid stream 12 that flows through the downcomer 14. Alternatively, the sump 44 may extend below de-entrainment device 8 to collect liquid exiting the bottom of the device 8. A liquid weir 37, that is preferably an integral part of the perforated plate that forms the inner side 25 of the de-entrainment device 8, is preferably used in the tray design to build up a pool of liquid 40 through which the vapor stream 26 passes and to prohibit the liquid from passing through the de-entrainment device 8 without first rising in a co-current fashion with the vapor stream within the co-current contacting section 16.

The particular design technology used to form the de-entrainment device 8 is not an aspect of the present invention as there are numerous commercially available technologies that can be chosen from to form the de-entrainment device. In general, the de-entrainment devices 8 are vertically oriented mist eliminator devices. Their function is to remove entrained liquid droplets from the flowing gas stream and allow the liquid to drain, typically under the force of gravity, into the sump 44 of the downcomer.

In one embodiment, a "Chevron" type mist eliminator is used as the de-entrainment device 8, where the mist eliminator is formed from vertically parallel plates of corrugated metal with the axes of the corrugation running vertically. In use, the vapor stream 32 and liquid stream 30 traverse horizontally through the vertical plates and are forced to make successive turns at the bends of the corrugated plates, which are typically bent at 90 angles. The entrained liquid droplets, having a greater mass (and thus, inertia) are thrown from the vapor stream as that stream turns through the inside of the mist eliminator and the liquid droplets strike the plates. The liquid droplets then drain down the face of the plates due to gravity. Such a mist eliminator design for the de-entrainment device 8 is shown in FIG. 2 by lines 46, which represent the edges of the plates at their bends.

Figure 3:
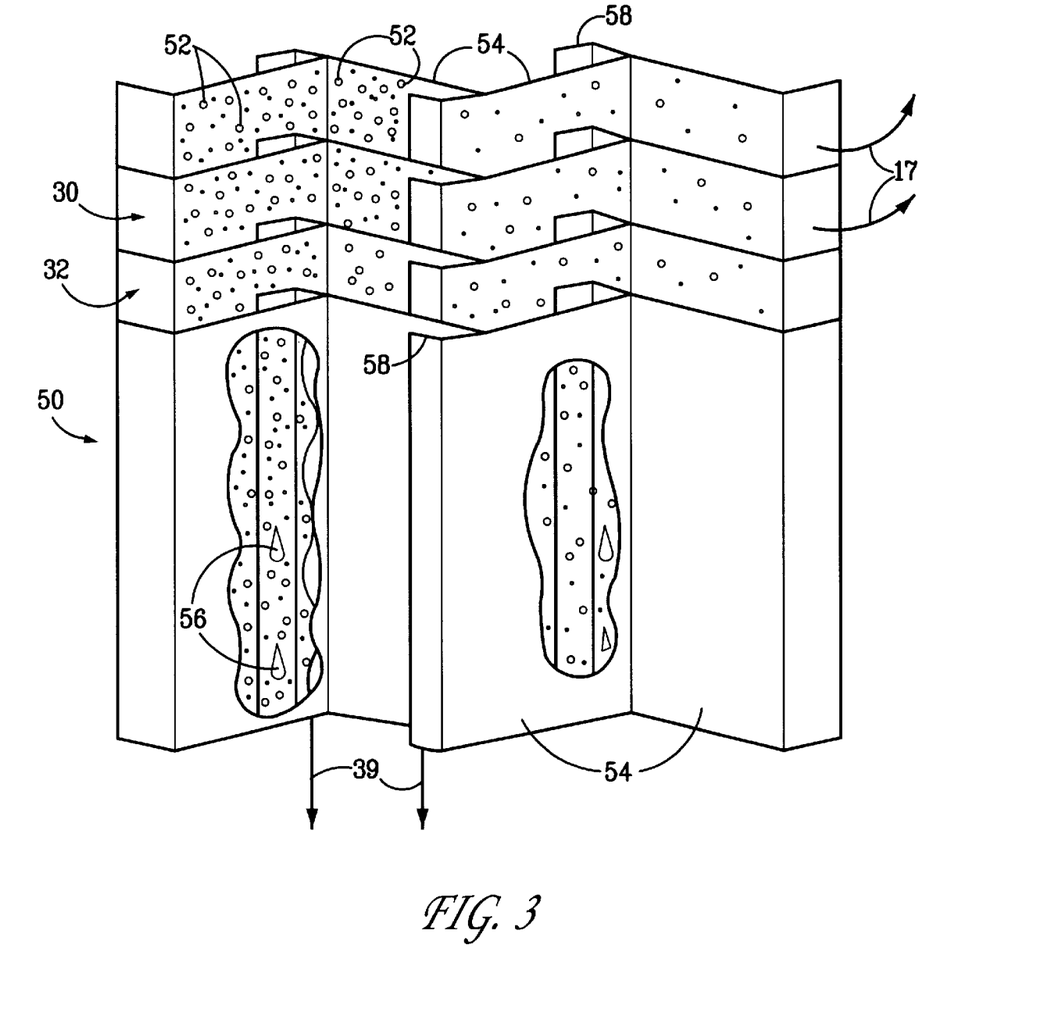
FIG. 3 is a partial view of a section of one embodiment of the de-entrainment device of the present invention.

Another embodiment of a mist eliminator is shown in FIG. 3 wherein there is shown just a portion of the mist eliminator that would be extended to fill the area on the tray for the de-entrainment device 8. In this mist eliminator 50 the vapor stream 32 and the entrained liquid stream 30 enter the mist eliminator 50 together and droplets 52 of the liquid collector on the corrugated plates 54. Due to gravity, the liquid droplets 52 flow downward over the surface of the plates 54 and form larger droplets 56. In this embodiment, there are specially formed "hooks" 58 that form a quiet zone for collection of the liquid and that inhibit the re-entrainment of the liquid droplets 52 in the vapor stream 32. Thus, the vapor stream 32 exits the mist eliminator 50 with a lower entrained liquid content as vapor stream 17; the liquid stream 30 collects within the eliminator and exits as a liquid stream 39.

The mist eliminators can take other specific designs, but the basic technology is the same: separation of the liquid droplets from the vapor stream by passing both streams through corrugated metal sheeting or plates. Typically, the metal sheets are made from steel. In the present invention, it is preferred to use a thin gauge metal plate in the mist eliminator design to decrease the overall weight of each tray. Other materials of construction, such as plastic or fiberglass materials could be used. Plastic materials may be beneficial in allowing for the design of smoother edges that could reduce the pressure drop across the de-entrainment device. Mist eliminators are commercially available from such companies as Koch Engineering Co. and the Otto H. York Company, Inc.

Various other technologies can be used as the de-entrainment devices 8 beyond the mist eliminators described above as the "Chevron" type systems. For instance, mesh pads constructed of woven metal threads can be used and are commercially available. Also, structured packings or grids can be used as the de-entrainment devices 8. Combinations of these various technologies can also be employed, with the first device functioning as a coalescer of liquid droplets and the second device functioning as the collector of the coalesced droplets.

In certain embodiments he design of the area of the tray at the outlet 28 of the downcomer 14 may be modified to inhibit the flow of vapors 22 up through the downcomer 14 and thereby circumventing the co-current contacting section 16. In one embodiment, the downcomer 14 has an opening 28 that is a restricted orifice so that a higher head of pressure is established within the lower section 15 of the downcomer than in the co-current contacting section 16. Another embodiment would include a moving check valve positioned at the opening 28 of the downcomer 14 to prevent upward vapor flow. A check valve can be simply fashioned as a lightweight moving plate below the end of the downcomer that is free to move upward and seal off the downpipe should vapor attempt to flow upward through the downcomer. As another alternative, the opening 22 can be arranged so that they are not directly beneath the opening 28 of the downcomer 14.

Figure 4:
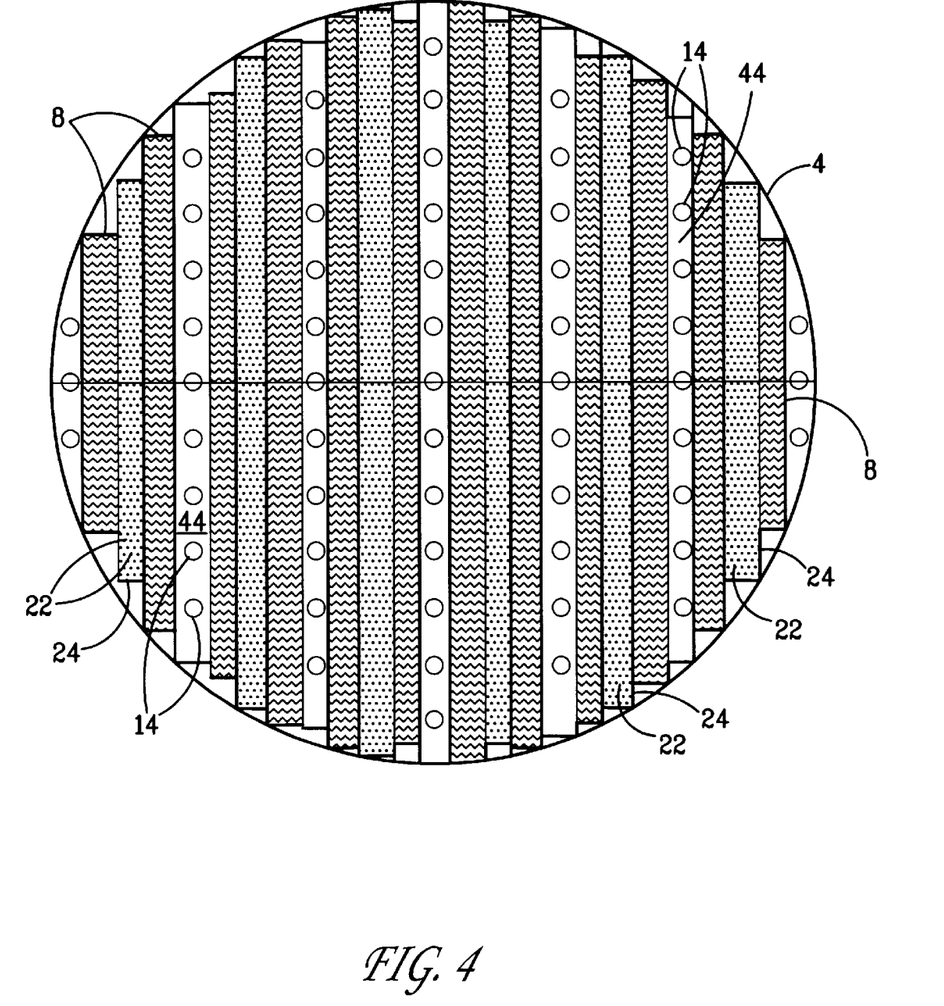
FIG. 4 is a top view of a cross-section of a column in which one embodiment of the tray design of the present invention is incorporated.

A top view of a tray depicted in accordance with the present invention situated within the column wall 4 is shown in FIG. 4. The various components of the tray are seen as rows extending to the outer circumference of the column as defined by the wall 4. From this top view the liquid downcomers 14 are seen as circular sections extending downward from the sump 44 of the downcomers 14. Beside the downcomers 14 are the de-entrainment devices 8, shown here as corrugated lines of a demister device. Positioned between the de-entrainment devices 8 is the co-current contacting space 16, which is shown as the openings 22 through the bottom 24 of the trays. For convenience, the rows of the individual sections have not been shown to extend to the edges of the wall 4, although in practice these sections would extend to the wall 4 or preferably as close thereto as possible to thereby minimize any "dead space" within the column.

The principles of one embodiment of the inventive tray design of the present invention have been described with respect to the embodiments set forth in FIGS. 1–4. The optimum proportions and sizing of the various components of the tray design are within the skill of those in the art and depend on the specific column to which the invention is to be applied. However, in general, the following dimensions are applicable to most column designs. The height difference between the bottom 24 of a tray to the bottom 24 of the next tray is from about 18 to about 36 inches (about 46–92 cm). The distance between the top 42 of a tray and the bottom 24 of the next tray is from about 4 to about 8 inches (about 10–20 cm). The width of the area where the openings 22 are present in the bottom 24 of the tray is from about 6 to about 12 inches (about 15–30 cm). The width of the area of the de-entrainment devices 8 is from about 3 to about 6 inches (about 7.5–15 cm). The diameter of the lower section 15 of the downcomer 14 is about 2 to about 4 inches (about 5.0–10.0 cm). The width of the total co-current contacting section is about 8 to about 16 inches (about 20–41 cm). The height of the tray from its bottom 24 to its top 42 is about 12 to about 28 inches (about 30–71 cm). The height of the weir 37 is from about 2 to about 4 inches (5–10 cm).

Figure 5:
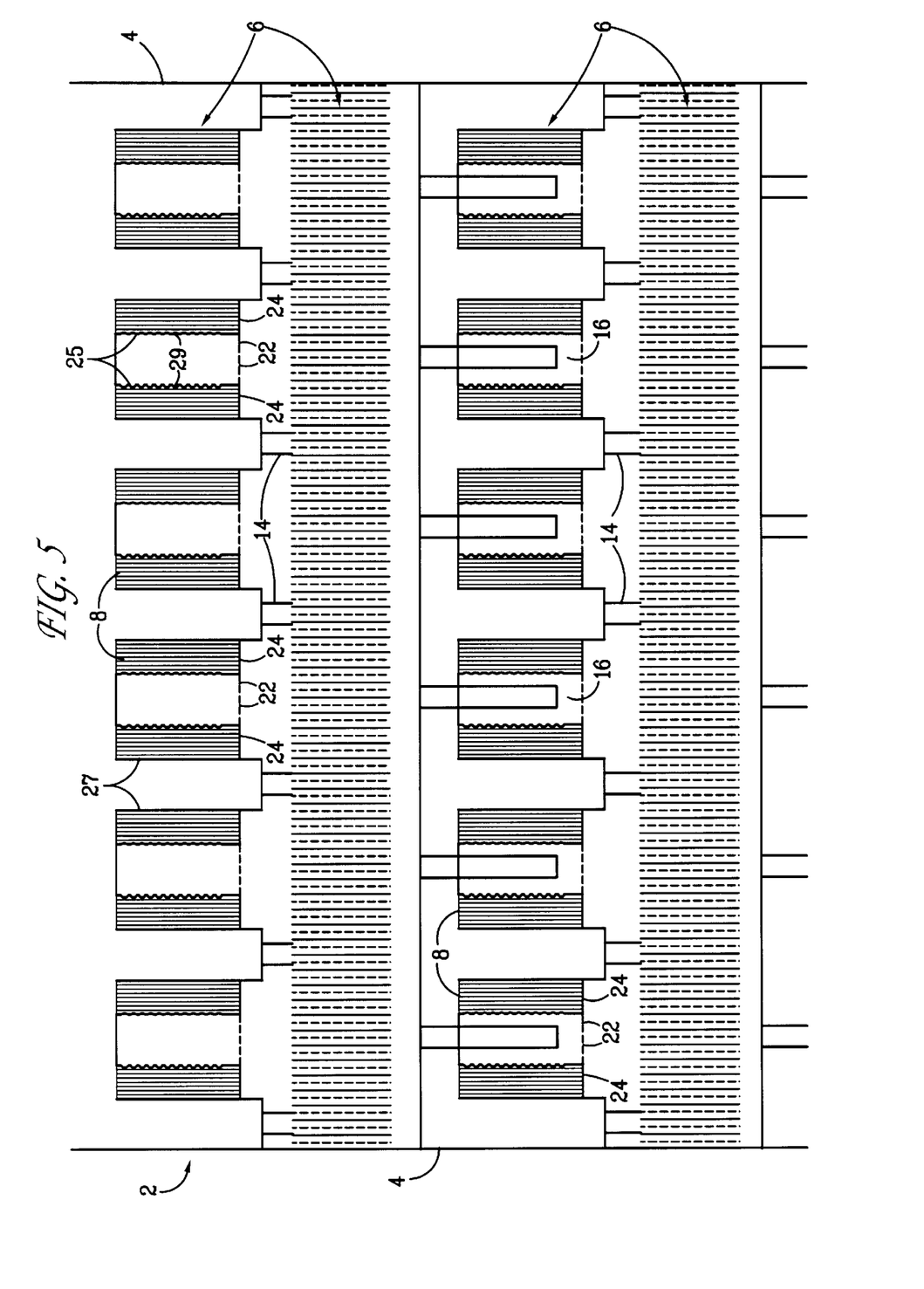
FIG. 5 is a schematic cross-sectional view of an interconnected tray design of one embodiment of the present invention using a 90 tray rotation.

Various modifications can be made to the arrangement of the trays 6 within the column 2. As shown in FIGS. 1 and 2, the trays 6 are aligned within the column 2. The trays 6 can be rotated within the column, such as is shown in FIG. 5, where the trays are staggered in a 90 off-set pattern. As shown in FIG. 5, the basic components of the trays are labeled as in FIG. 1.

The separation efficiency of each tray can be improved in accordance with a further embodiment of the present invention. In this alternative embodiment, the liquid phase is directed across at least a portion of a tray such that the liquid is contacted in a co-current fashion with the vapor phase more than once on that particular tray. The resulting flow pattern can be referred to as a "cross flow" design. This tray design improves the separation efficiency of the tray, although it may sacrifice liquid handling capacity to achieve the former result.

Figure 6:
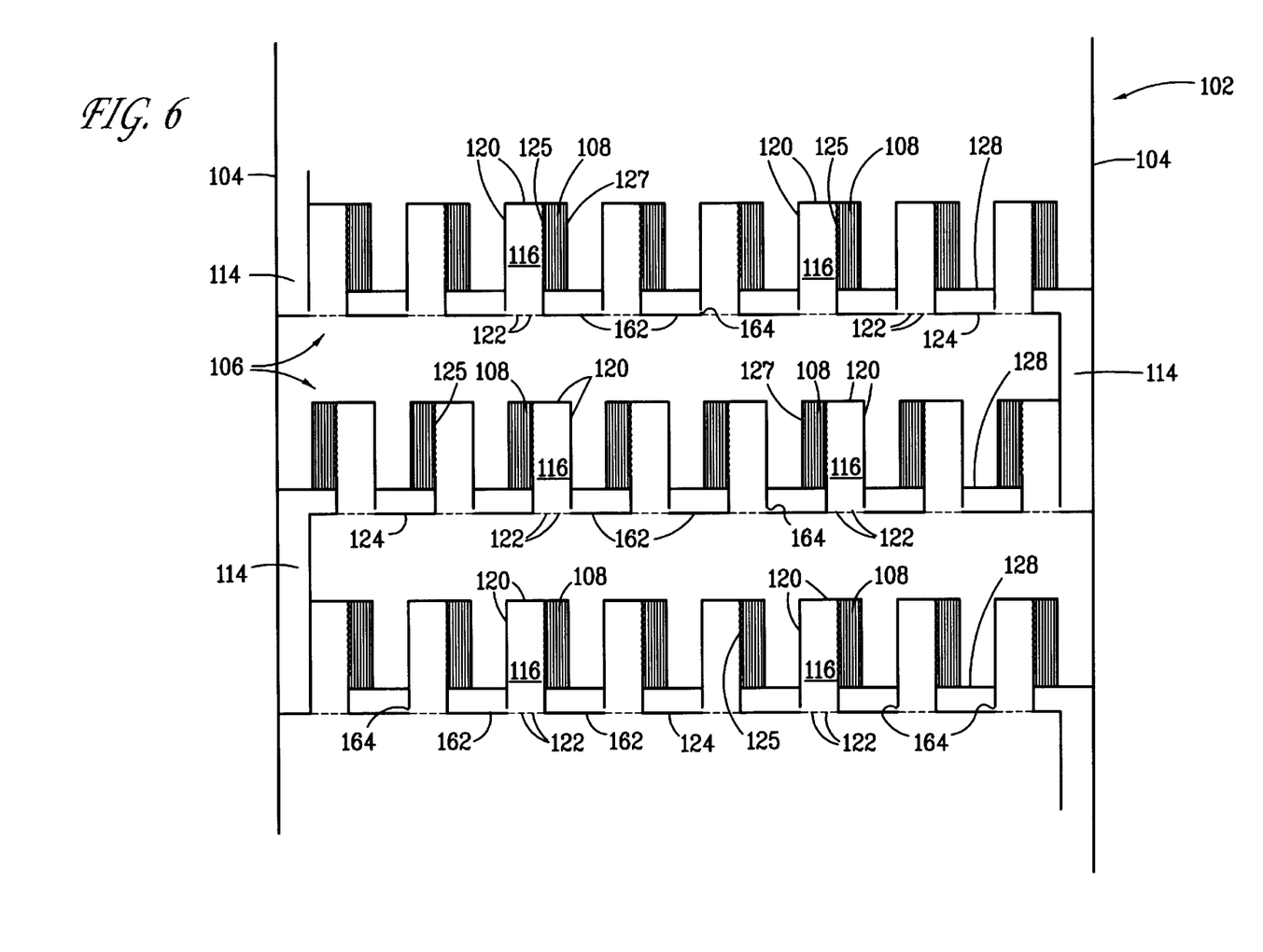
FIG. 6 is a schematic cross-sectional view, in detail, of one embodiment of the interconnected tray design of the present invention.

One embodiment of the cross flow design is shown in FIG. 6, which illustrates a cross-sectional portion (3 trays) of a separation column, where each tray incorporates the cross flow design of the present invention. As set forth in FIG. 6, the distillation column 102 has side walls 104 that generally define a cylindrical column shape. The general description of the cross flow tray design is shown in FIG. 6, with a more detailed description of the mass flows within the column 102 being set forth with the figures that follow. The trays 106 contain the basic components found in the separation trays described in FIGS. 1–5: a plurality of co-current contacting sections 116 and a plurality of de-entrainment devices 108 associated with each co-current contacting section 116. In this embodiment, the de-entrainment devices 108 are present on only one side of the co-current contacting sections 116. The co-current contacting sections 116 are otherwise bounded by a wall 120 that serves to restrict the flow of the combined vapor and liquid streams such that they pass through the de-entrainment devices 108. The bottom 124 of the trays 106 is perforated or otherwise modified to provide openings 122 through which vapors rising from a vertically lower tray 106 can pass into a vertically higher tray 106. Liquid downcomers 114 provide a passageway for the liquid to flow from an upper tray to a lower tray. The bottom of the de-entrainment device 108 is raised above the tray bottom 124 by a distance of roughly equal to the liquid head that matches the total tray pressure drop. A seal plate 128 extends horizontally from the bottom of the de-entrainment device 108 to the wall 120 of the adjacent contacting volume. Plate 128 forms a liquid conduit 162 which guides the liquid after it exits the de-entrainment device 108. Plate 128 may have holes in it to allow any liquid which inadvertently exits the outside 127 of the de-entrainment devices to drain into the conduit 162. To prevent backflow of the liquid from conduit 162 to the previous contacting volume 116, the walls 120 extend to the tray bottom 124 on the side of the co-current contacting sections 116 adjacent to the de-entrainment devices 108. On the opposite side, walls 120 stop short of the tray bottom 124 to form a liquid escape opening 164 that directs the liquid stream to flow to a subsequent contacting volume 116. The size of the opening 164 can be adjusted depending on the particular processing parameters for the chosen operation to ensure that an adequate liquid head is maintained within the liquid conduits 162 to prevent the vapor stream from diverting around the co-current contacting section 116. Once in the co-current contacting section 116, the liquid is entrained in the up-rising vapor stream that passes through the opening 122. This combined vapor and liquid stream then passes through the de-entrainment devices 108. The inner side 125 of the de-entrainment devices 108 can be fabricated to be a perforated plate such that openings (such as those shown in FIGS. 1 and 2(29)) provide a passageway for the vapors and entrained liquid to enter into the de-entrainment devices 108.

Figure 7:
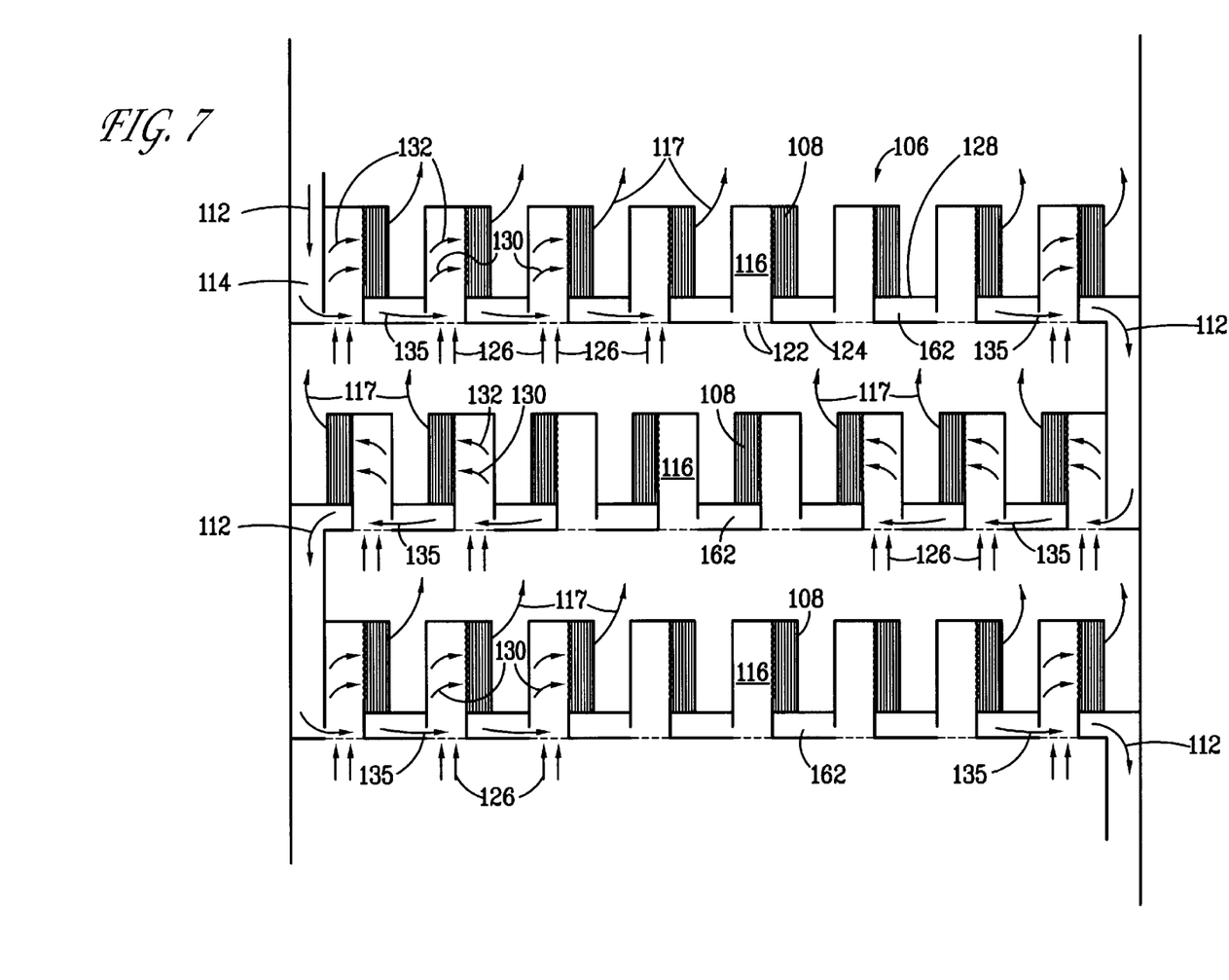
FIG. 7 is a schematic cross-sectional view, in detail with flow depicted, of one embodiment of the interconnected tray design of the present invention.

FIG. 7 illustrates the upward flow of the vapor stream and the downward flow of the liquid stream with respect to the particular embodiment of the cross flow tray design of the present invention described in FIG. 6. Starting with the uppermost depicted tray 106, the liquid stream 122 enters the tray via the downcomer 114. The liquid stream 112 enters the first row of co-current contacting sections 116 and is entrained by the up-rising vapor stream 126 flowing through the openings 122 through the bottom 124 of the tray 106 to form an entrained liquid stream 130 and an entraining vapor stream 132. Thus, these entrained processing streams are in intimate co-current contact, in an upward rising fashion, within the co-current contacting section 116. The walls 120 that bound the co-current contacting section 116 prevent these entrained processing streams 130, 132 from passing to the next tray without first traversing the de-entrainment device 108.

The entrained processing streams 130, 132 are de-entrained within the de-entrainment devices 108, which are of a similar construction for this cross flow tray design as the de-entrainment devices 8 described with respect to FIGS. 1–5. The de-entrained liquid stream 135 exits the de-entrainment device 108 and flows into the liquid conduits 162 that direct the liquid stream 135 through the openings 164 that lead into a subsequent co-current contacting section 116 on the tray. The de-entrained vapor stream 117 exits the tray 106 and proceeds upwardly to the next tray.

In accordance with the practice of the present invention using the cross flow tray design, the liquid stream 112 entering a new tray 106 will pass through a series of co-current contacting sections 116, and consequently a series of de-entrainment devices 108. In contrast to the embodiment of the invention shown in FIGS. 1–5, the cross flow design directs the liquid stream 135 horizontally across a selected tray 106 to provide a cross flow effect rather than moving directly downward after each co-current contacting step. The number of de-entrainment steps per tray can vary from at least two, to three, four, five, and in some embodiments ever higher up to six, seven, eight, nine, or ten, or greater depending on the size of the column, etc.

Figure 8:
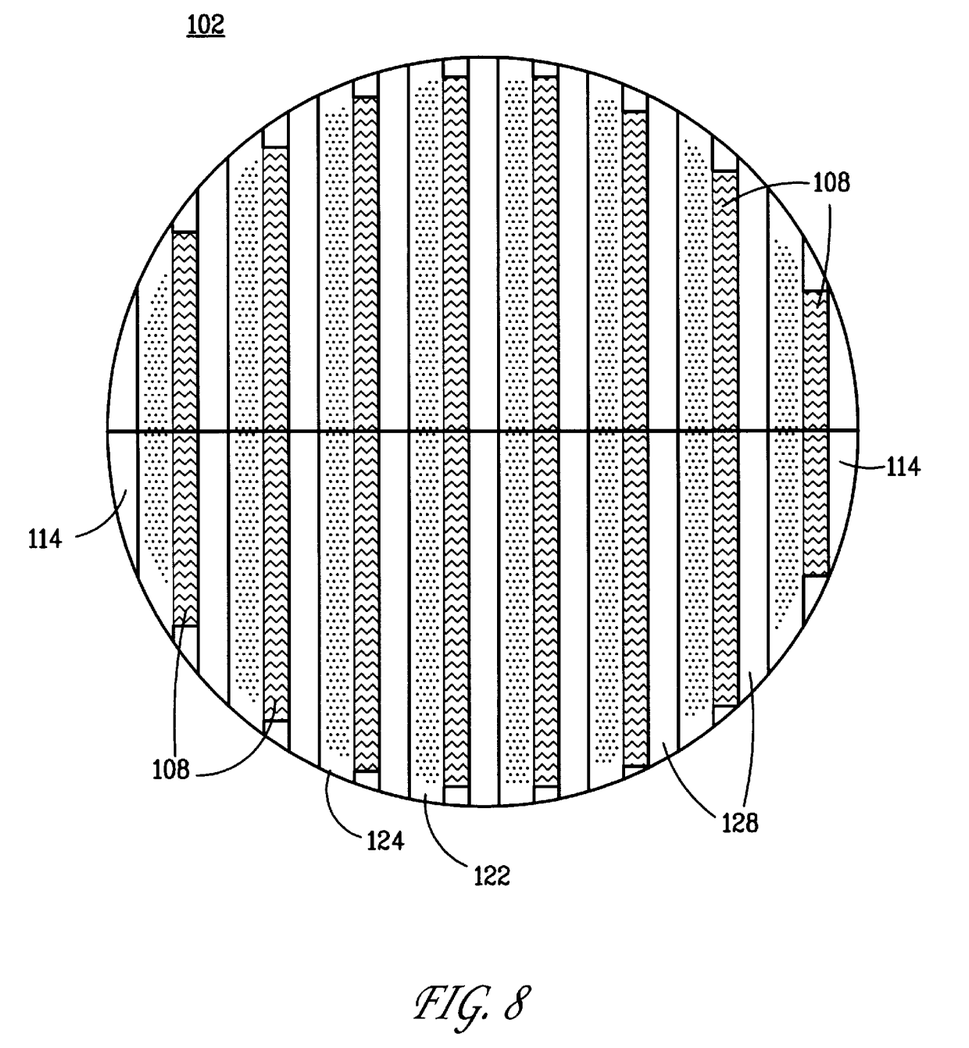
FIG. 8 is a top view of a cross-section of a column in which one embodiment of the tray design of the present invention is incorporated.

A top view of the tray designed in accordance with the embodiment shown in FIGS. 6 and 7 is shown in FIG. 8. The various components of the tray are seen as rows extending to the outer circumference of the column 102 as defined by the wall 104. From this top view the liquid downcomers 114 are seen on both sides of the column 102. Paired together are the co-current contacting sections 116 (shown here as the tray bottom 124 section and the openings 122 beneath these sections) and the de-entrainment devices 108. To the downstream side of the de-entrainment devices 108 are the liquid conduits 162 (shown here as seal plates 128). The de-entrainment devices 108 are shown here as corrugated lines of a demister device. For convenience, the rows of the individual sections have not been shown to extend to the edges of the wall 104, although in practice these sections would extend to the wall 104 or preferably as close thereto as possible to thereby minimize any "dead space" within the column 102.

Figure 9:
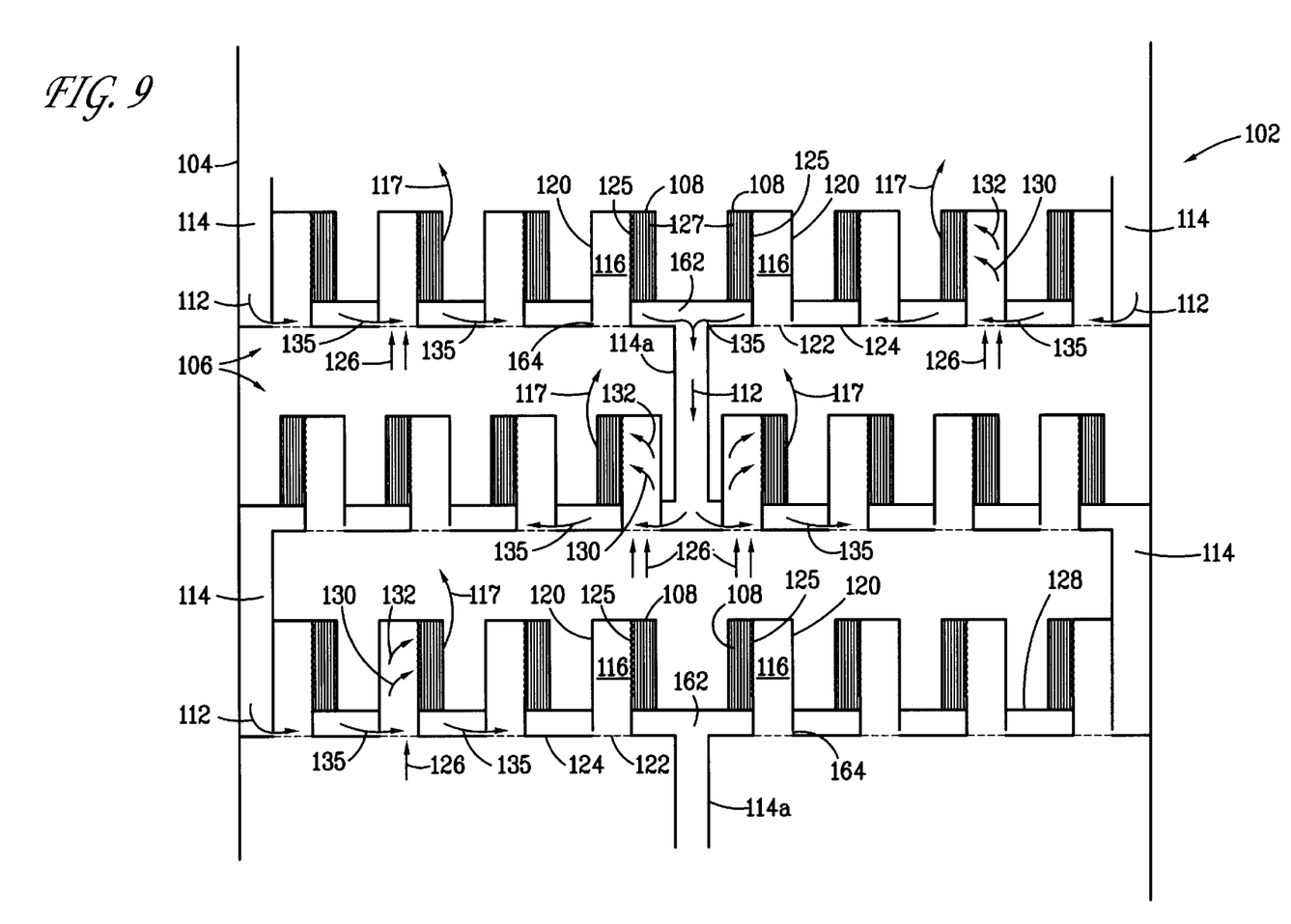
FIG. 9 is a schematic cross-sectional view, in detail with flow depicted, of one embodiment of the interconnected tray design of the present invention.

An alternative embodiment of the cross flow design of the present invention is shown in FIG. 9. This embodiment depicts a "two pass" tray design as opposed to the "one pass" design illustrated in FIG. 6. The basic design features are the same—the co-current contacting sections 116, which are bounded by walls 120 and the de-entrainment devices 108, with inner sides 125 and outer sides 127. The trays 106 also have tray bottoms 124 with openings 122 for the vapors to enter the tray, and liquid conduits 162 for liquid flow within a tray 106 through openings 164. This two pass configuration is different in that it has a center downcomer 114a along with downcomer 114 on both sides of the tray 106. In such a way, the liquid flow rate is increased throughout the column, although at the sacrifice of separation efficiency. This embodiment of the tray design illustrates that multiple downcomers can be associated with each tray. The liquid and vapor stream flow paths are similar to those shown for the single pass tray design, with the liquid streams 135 flowing outward on those trays having downcomers 114 located near the walls 104 and the liquid streams 135 flowing inward on those trays having a center downcomer 114a located in the middle of the tray.

The overall flow of the liquid and vapor streams within the two pass tray design illustrated in FIG. 9 is similar to that for the one pass embodiment previously discussed with respect to FIGS. 6–7. The rising vapor stream 126 passes through the tray bottom 124 through the openings 122 and enters into the co-current contacting section 116. The liquid stream 112 enters the tray from the downcomers 114, 114a and enters into the co-current contacting section 116. The entrained liquid stream 130 and the entraining vapor stream 132 rise up through the co-current contacting section 116 and then pass through the de-entrainment device 108, wherein the two streams are separated. The de-entrained liquid flows out of the de-entrainment device 108 and forms the liquid stream 135 that flows within the liquid conduit 162 to the next co-current contacting section 108 on that particular tray 106, or, eventually, into a downcomer. The de-entrained vapor stream 117 exits the de-entrainment device 108 and rises from a lower tray to the next, vertically higher tray in the column.

Figure 10:
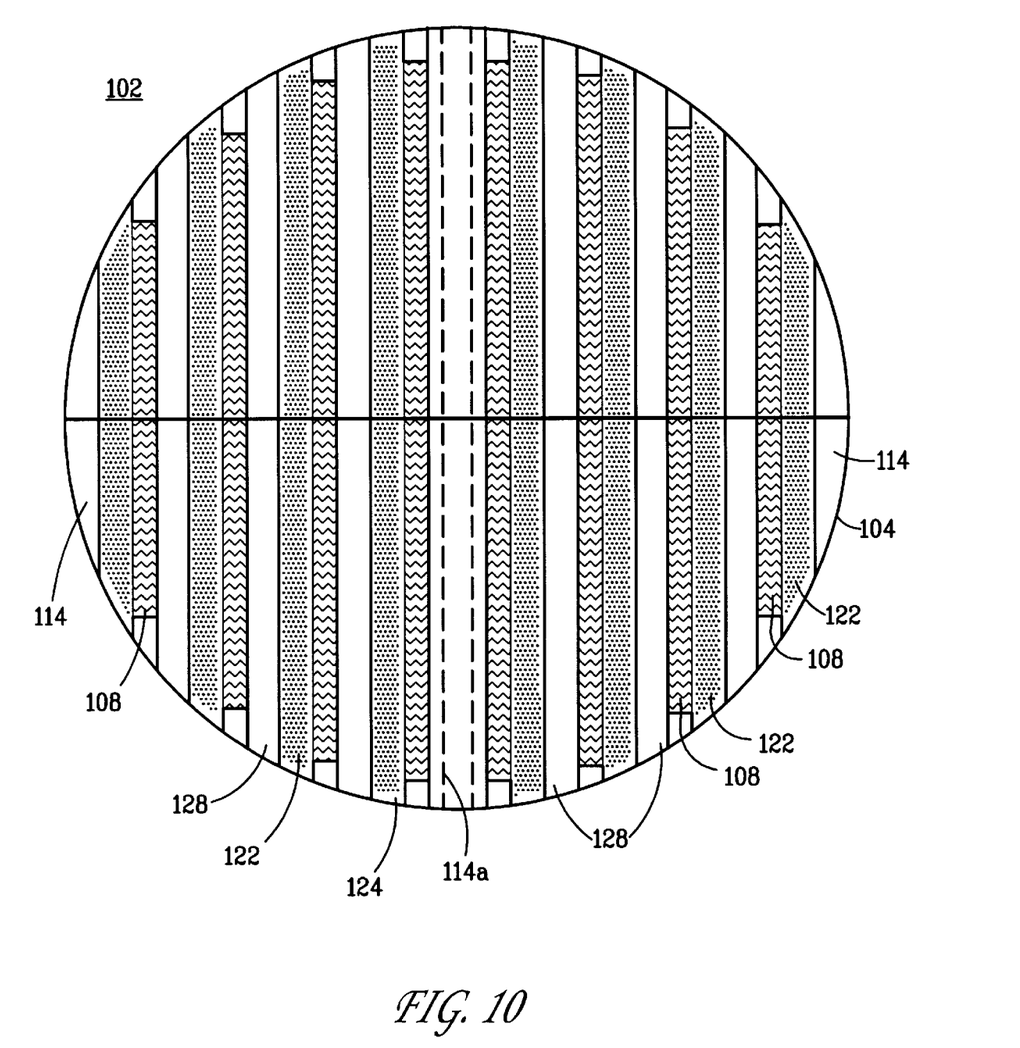
FIG. 10 is a top view of a cross-section of a column in which one embodiment of the tray design of the present invention is incorporated.

A top view of the tray designed in accordance with the two pass embodiment shown in FIG. 9 is shown in FIG. 10. The various components of the tray are seen as rows extending to the outer circumference of the column 102 as defined by the wall 104. From this top view the liquid downcomers 114 are seen on both sides of the column 102. Paired together are the co-current contacting sections 116 (shown here as the tray bottom 124 section and the openings 122 beneath these sections) and the de-entrainment devices 108. To the downstream side of the de-entrainment devices 108 are the liquid conduits 162. (Shown here as seal plates 128). The de-entrainment devices 108 are shown here as corrugated lines of a demister device. For convenience, the rows of the individual sections have not been shown to extend to the edges of the wall 104, although in practice these sections would extend to the wall 104 or preferably as close thereto as possible to thereby minimize any "dead space" within the column 102. The center downcomer 114a is depicted in the middle of the column 102.

The principles of a second embodiment of the inventive tray design of the present invention have been described with respect to the embodiments set forth in FIGS. 6–10. The optimum proportions and sizing of the various components of the tray design are within the skill of those in the art and depend on the specific column to which the invention is to be applied. However, in general, the following dimensions are applicable to most column designs. The height difference between the bottom 124 of a tray to the bottom 124 of the next tray can be from about 18 to about 36 inches (about 46–92 cm). The height of a tray can be from about 12 to about 28 inches (about 30–71 cm). The width of the co-current contacting section 116 is about 8 to about 16 inches (about 20–41 cm). The width of the area where the openings 122 are present in the bottom 124 of the tray is from about 6 to about 12 inches (about 15–30 cm). The width of the de-entrainment device 108 is from about 3 to about 6 inches (about 7.5–15 cm). The width of the center downcomer 114a can be about 2 to about 8 inches (about 5.0–20.0 cm). The height of the liquid conduits 162 is from about 3 to about 8 inches (about 7–20 cm). The preferred height of the opening 164 in the liquid conduit is from about ½ to about 2 inches (about 1.3–5 cm).

Various modifications can be made to the arrangement of the trays 106 within the column 102. Multiple pass systems can be used beyond the two pass design depicted in FIGS. 9–10. Turning vanes may be used in place of or in conjunction with the aforementioned perforated plates 25/125 to properly introduce the co-current streams 30/32, 130/132 into the de-entrainment devices 8, 108.

What is claimed is:

1. A separation column for distilling or fractionating a feedstream, comprising:
    (a) a plurality of interconnected trays having a tray bottom;
    (b) a plurality of co-current vapor and liquid contacting sections, located on the trays, comprising a volume in which vapors and liquid can be in co-current contact;
    (c) a plurality of de-entrainment devices, located on the trays, for separating entrained liquids from a vapor stream, the de-entrainment devices having an inner and an outer side, the inner side being adjacent to the co-current contacting sections, and the inner side of the de-entrainment devices being permeable to vapors and entrained liquids and the outer side of the de-entrainment devices being permeable to vapors;
    (d) a plurality of liquid conduits, located on the trays, that provide a passageway for liquid exiting a first de-entrainment device adjacent to a first co-current contacting section to enter a second co-current contacting section on the same tray as the first co-current contacting section;
    (e) at least one liquid downcomer, located between two vertically adjacent trays, for transporting liquid from the vertically higher tray to the vertically lower tray; and
    (f) vapor openings, located through the bottom of the trays at a point beneath the co-current contacting sections, through which vapors can pass into the co-current contacting section of the tray.

2. The separation column of claim 1 wherein there is one liquid downcomer associated with each tray to provide a one-pass tray configuration within the separation column.

3. The separation column of claim 1 wherein there is a central liquid downcomer associated with alternating trays to provide a two-pass tray configuration within the separation column.

4. The separation column of claim 1 wherein there are at least four de-entrainment devices on at least one tray.

5. A method for operating a separation column, comprising the steps of:
    (a) providing a column comprising:
        (i) a plurality of interconnected trays having a tray bottom;
        (ii) a plurality of co-current vapor and liquid contacting sections, located on the trays, comprising a volume in which vapors and liquid can be in co-current contact;
        (iii) a plurality of de-entrainment devices, located on the trays and adjacent to the co-current contacting sections;
        (iv) a plurality of liquid conduits, located on the trays, that provide a passageway for liquid exiting a first de-entrainment device adjacent to a first co-current contacting section to enter a second co-current contacting section on the same tray as the first co-current contacting section;
        (v) at least one liquid downcomer, located between two vertically adjacent trays; and
        (vi) vapor openings, located through the bottom of the trays at a point beneath the co-current contacting sections;
    (b) flowing liquid through a first liquid downcomer and into a first co-current contacting section of a first tray;

(c) flowing vapors to a first tray from a second tray vertically beneath the first tray;

(d) directing the vapors through the vapor openings of the first tray and into the first co-current contacting section of the first tray, whereby the vapors entrain liquid within the first co-current contacting section of the first tray to form an entrained fluid that travels upward through the first co-current contacting section of the first tray;

(e) passing the entrained fluid through a first de-entrainment device of the first tray to thereby separate at least a portion of the entrained liquid from the vapors to form a first de-entrained liquid and separated vapor;

(f) directing the first de-entrained liquid from the first de-entrainment device of the first tray through one of the liquid conduits to a second co-current contacting section on the first tray and contacting the first de-entrained liquid with the vapors to form a second entrained fluid that travels upward through the second co-current contacting section of the first tray;

(g) passing the second entrained fluid through a second de-entrainment device of the first tray to thereby separate at least a portion of the entrained liquid from the vapors to form a second de-entrained liquid and separated vapor;

(h) directing the separated vapor from the first and second de-entrainment devices of the first tray to a third tray that is vertically above the first tray; and (i) directing the separated liquid from the first and second de-entrainment devices of the first tray to the second tray.

6. The method of claim 5 further comprising:

(a) directing the second de-entrained liquid from the second de-entrainment device of the first tray through one of the liquid conduits to a third co-current contacting section on the first tray and contacting the second de-entrained liquid with the vapors to form a third entrained fluid that travels upward through the third co-current contacting section of the first tray;

(b) passing the third entrained fluid through a third de-entrainment device of the first tray to thereby separate at least a portion of the entrained liquid from the vapors to form a third de-entrained liquid and separated vapor.

7. A method for operating a separation column, comprising the steps of:

(a) providing a column comprising:
(i) a plurality of interconnected trays having a tray bottom;
(ii) a plurality of co-current vapor and liquid contacting sections, located on the trays, comprising a volume in which vapors and liquid can be in co-current contact;
(iii) a plurality of de-entrainment devices, located on the trays and being adjacent to the co-current contacting sections;
(iv) a plurality of liquid conduits, located on the trays, that provide a passageway for liquid exiting a first de-entrainment device adjacent to a first co-current contacting section to enter a second co-current contacting section on the same tray as the first co-current contacting section;
(v) at least one liquid downcomer, located between two adjacent trays; and
(vi) vapor openings, located through the bottom of the trays at a point beneath the co-current contacting sections;

(b) flowing liquid through at least one of the liquid downcomers into a first tray from a vertically higher second tray and flowing vapors into the first tray through the vapor openings of a first tray from a third tray vertically beneath the first tray;

(c) repeatedly contacting the liquid with the vapor on the first tray by sequentially passing the liquid into a plurality of co-current contacting sections on the first tray and therein contacting the liquid with the vapor to form an entrained fluid comprising entrained liquid and vapor;

(d) repeatedly separating the entrained liquid from the vapor on the first tray any passing the entrained fluid through a first de-entrainment devices on the first tray; and (e) conducting the repeated contacting and separating steps on a plurality of trays within the separation column.

8. The method of claim 7 further comprising the steps of directing the vapors from the de-entrainment devices on the first tray to the second tray;

directing the liquid from the de-entrainment devices on the first tray to the third tray.

9. The method of claim 7 wherein the de-entrainment devices have an inner surface that is a wall having perforations through which fluids can pass, and further comprising passing the entrained fluid through the perforations in the wall of the inner surface of the de-entrainment devices.

10. The method of claim 7 wherein the de-entrainment devices contain turning vanes, and further comprising passing the entrained fluid through the de-entrainment devices and directing the flow of the entrained fluid with the turning vanes.

* * * * *